April 12, 1949.                F. J. MACHOVEC                2,466,905
                              LAWN MOWER SHARPENER
Filed Dec. 3, 1945                                           3 Sheets-Sheet 1
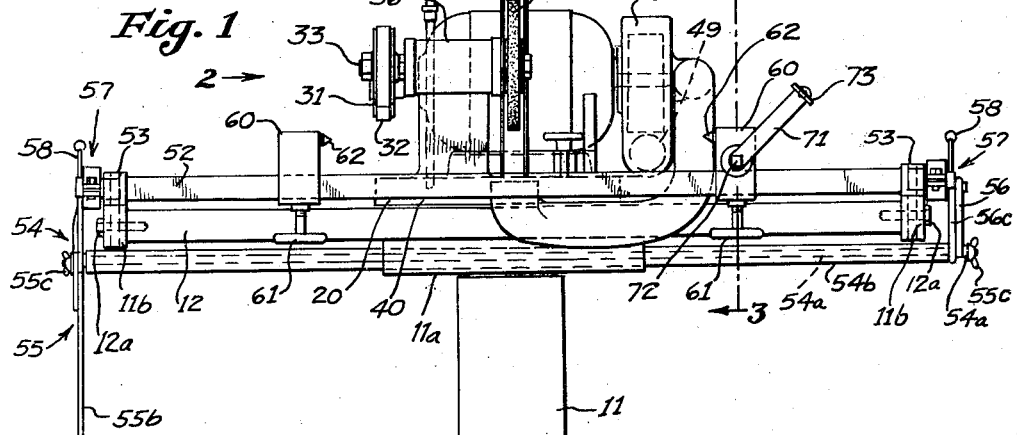
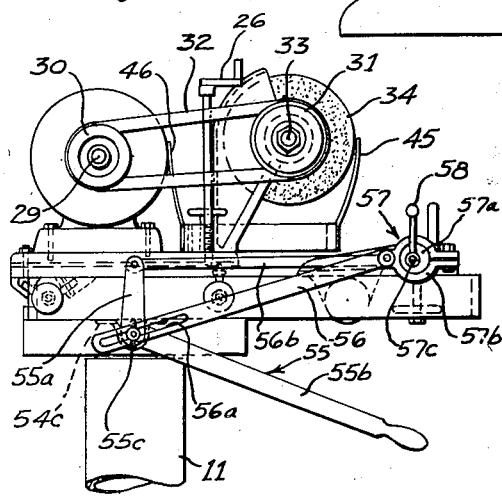
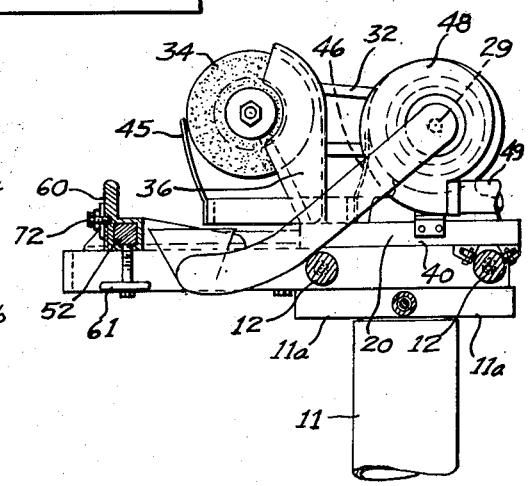
INVENTOR
FRED J. MACHOVEC
By HARRIS, KIECH, FOSTER & HARRIS
FOR THE FIRM
ATTORNEYS April 12, 1949.  F. J. MACHOVEC  2,466,905
LAWN MOWER SHARPENER
Filed Dec. 3, 1945  3 Sheets-Sheet 3
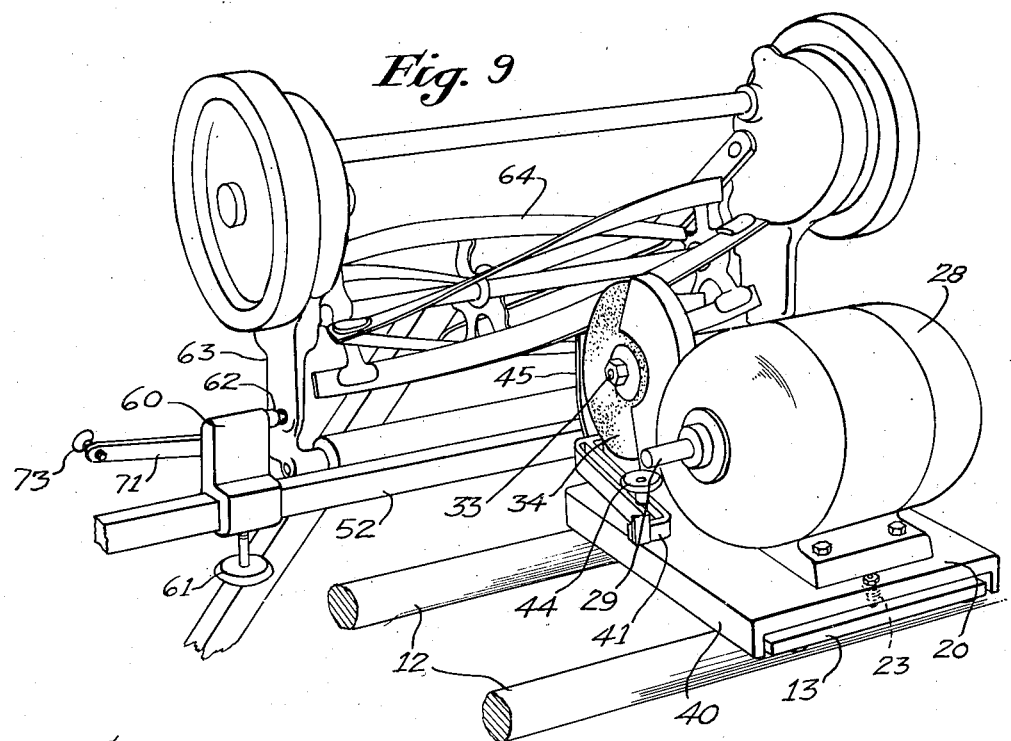
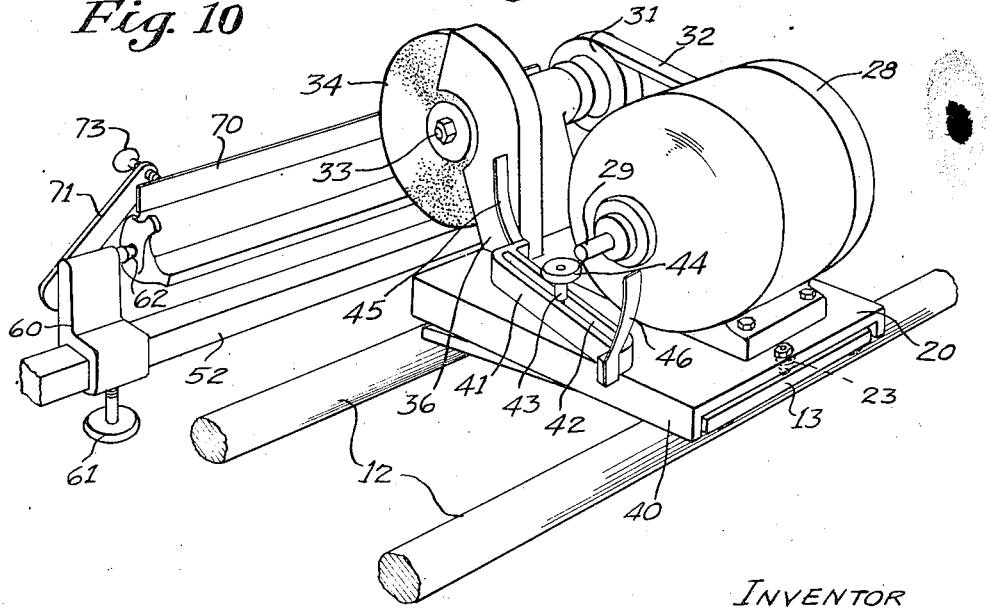
INVENTOR
FRED J. MACHOVEC
By HARRIS, KIECH, FOSTER & HARRIS
FOR THE FIRM
ATTORNEYS

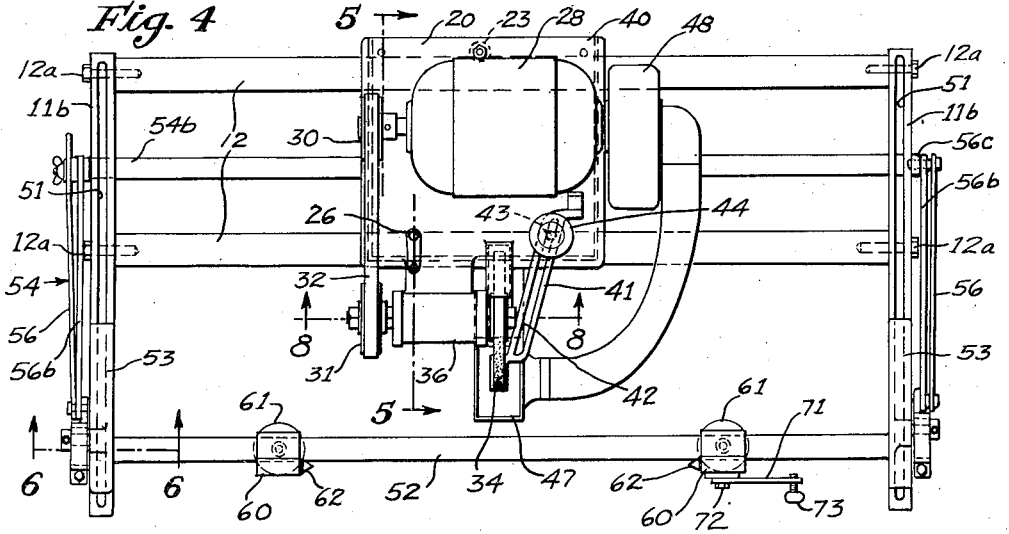
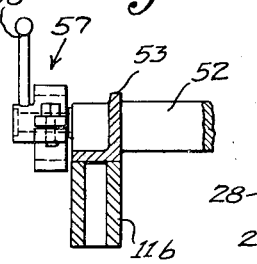
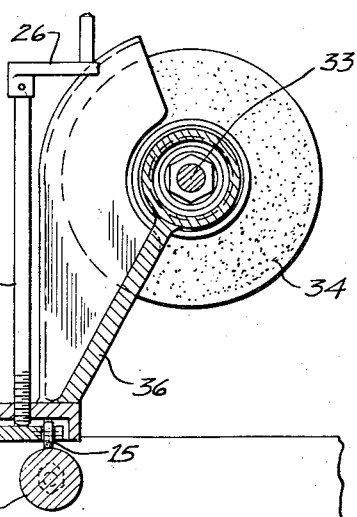
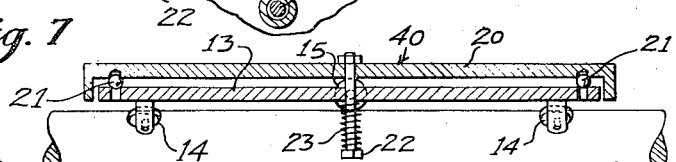
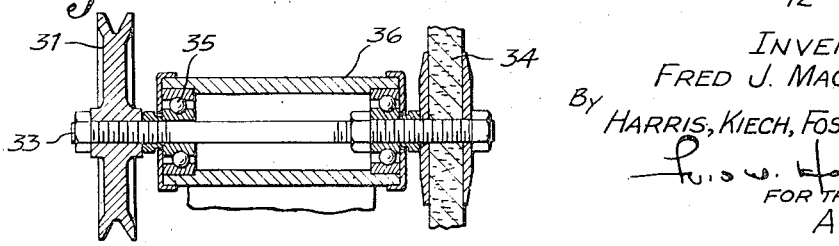

Patented Apr. 12, 1949

2,466,905

UNITED STATES PATENT OFFICE 2,466,905

LAWN MOWER SHARPENER

Fred J. Machovec, Pasadena, Calif.

Application December 3, 1945, Serial No. 632,315

7 Claims. (Cl. 51—34)

My invention relates to machines for sharpening lawn mowers, and the principal object of my invention is to provide a machine which may be adjusted to sharpen both right-hand and left-hand revolving knives and the cutter bars of nearly every form of lawn mower, both hand and power operated, which is now in common use in this country.

It is a further object of my invention to provide such a lawn mower sharpener which is not too expensive to build, which is easily operated, and which does not wear out rapidly when in use.

Further objects and advantages will be made evident hereinafter.

In the drawings, which illustrate the best mode in which I now contemplate applying the principles of my invention:

Fig. 1 is a side elevation of my sharpener;

Fig. 2 is an end elevation of the sharpener shown in Fig. 1, viewed in the direction of the arrow 2 of Fig. 1;

Fig. 3 is a partial end elevation, partly in section, of the sharpener shown in Fig. 1, viewed in the direction of the arrows 3 of Fig. 1;

Fig. 4 is a plan view of the sharpener shown in Fig. 1;

Fig. 5 is a sectional elevation, on a plane 5—5 of Fig. 4, of a portion of my sharpener;

Fig. 6 is a section on a plane 6—6 of Fig. 4, of a portion of my sharpener;

Fig. 7 is a section, on a plane 7—7 of Fig. 5, of a portion of my sharpener;

Fig. 8 is a section, on a plane 8—8 of Fig. 5, of a portion of my sharpener;

Fig. 9 is a perspective view of a portion of my sharpener as it is used in sharpening the revolving blades of a lawn mower; and Fig. 10 is a perspective view of a portion of my sharpener as it is used to sharpen the cutter blade of a lawn mower.

Referring particularly to Figs. 1 and 4, I show an upright pedestal 11 having a horizontal platform 11a rigidly mounted thereon by means of bolts, or in any other suitable manner or end member, a cross-member 11b being secured to each end of the horizontal platform by welding or otherwise. Disposed between the cross-members 11b is a pair of substantially parallel, spaced, horizontal guide bars 12 which are connected to the cross-members by removable screws 12a. As will be apparent hereinafter, by loosening the screws 12a, the guide bars 12 can be rotated individually on their own axes to present new surfaces thereof for engagement by the rollers of a sub-base 13 carried thereby, and this is a feature of the invention.

The sub-base 13 is supported on the guide bars 12 by five rollers, four of which are mounted on one guide bar and one of which is mounted on the other. Two of the four rollers 14 bear on one end of one of the bars 12 and the other two bear on the other end thereof, these rollers having their axes 30° from the vertical, and the roller 15 bears on the other of the bars 12 near or at the center thereof to provide three-point suspension, all as best shown in Fig. 5, the axis of the roller 15 being horizontal. The rollers 14 and 15 contain sealed ball bearings so that they turn very freely with a minimum of friction. The sub-base 13 provides a support for the grinding wheel, and the rollers 14 and 15 allow the wheel to be readily traversed in a direction parallel to the bars 12 with very little frictional resistance so that the operator can readily traverse the wheel manually into any transverse position, no slow-acting feed screw being necessary. A skilled operator can also traverse the wheel while it is cutting just as fast as it is advisable to cut, being able to judge the rate of cut by the resistance to his hand pressure which impels the wheel. The rollers 14 determine the horizontal position of the wheel, the roller 15 being simply a weight support. Thus, the rollers 14 and 15 cannot bind under any condition, and exact parallelism of the rods 12 is not necessary. The rods 12 are readily kept clean as the sub-base 13 and all parts carried thereon can be readily lifted off the rods for cleaning, but dirt on the rods does not interfere with the smooth traverse of the grinding wheel.

Carried on the sub-base 13 is a base 20. The base 20 is hinged to the sub-base at one end by the use of two steel balls 21 and a central bolt 22 carrying a compression spring 23 which tends to press the base 20 toward the sub-base 13. An adjusting screw 25 operated by a crank 26 is threaded in the base 20 and bears upon the sub-base 13, serving to raise or lower the grinding wheel with relation to the rods 12. Secured by bolts 27 on the base 20 is an electric motor 28 having a shaft 29 carrying a driving pulley 30. The pulley 30 drives a driven pulley 31 through a belt 32, the pulley 31 being fixed on a shaft 33 which carries the grinding wheel 34. The shaft 33 rotates in ball bearings 35 carried in an extension 36 of the base 20. The base 20 and sub-base 13 form a carriage 40 for the grinding wheel, which can be moved on the bars 12 into any transverse position by sliding the carriage over these bars, and the grinding wheel can be adjusted up and down between limits by the screw 25. A guide block 41 has a slot 42 through which a stud 43 secured in the base 20 passes, the stud having a handwheel 44 threaded on its upper end so that the guide block 41 can be clamped in various positions on the base 20. The guide block 41 has fingers 45 and 46 on opposite ends thereof, and the guide block 41 may be adjusted so that either or neither of the fingers may be moved into a position in front of the grinding wheel 34 and secured in that position by clamping the guide block to the base 20 by screwing down the handwheel 44. In this position the revolving blade to be ground is held in its proper position by the finger, one finger being used for right-hand rotating blades and the other for left-hand rotating blades. When the fixed blade of a lawn mower is ground, no finger is needed. An open-mouthed dust catcher 47 is placed below the wheel 34, dust being drawn into the dust catcher by means of a fan 48 and discharged through a hose 49 to a point where it is not objectionable.

Each of the cross-members 11b has a slot 51 therein, as best shown in Fig. 4. A square-section cross or work support bar 52 is secured at each end to sliders 53 which rest on the top of the cross-members 11b. The cross bar 52 supports the lawn mower to be sharpened, and the mower may be positioned toward or away from the grinding wheel 34 by an adjustment means 54 which, as best shown in Figs. 4 and 5, includes a transverse rod or lever shaft 54a rotatably housed in a sleeve 54b which is rigidly clamped to the bottom of each of the cross-members 11b by a suitable bracket 54c, as illustrated in Fig. 2. Adjacent one end of the transverse rod 54a is rigidly fixed, by welding or otherwise, a bell crank member 55 having an upwardly extending arm 55a and a handle arm 55b, this end of the rod projecting through the bell crank member and each end thereof being externally threaded to receive a wing nut 55c as best shown in Fig. 2. The ends of the rod 54a project through slots 56a in diagonal brace members 56 which are pivotally connected to the sliders 53, one of the sliders also being pivotally connected to a connecting rod 56b through the medium of the bearing 57b and the eccentric 57a and which is pivotally connected to the arm 55a of the bell crank member 55 as best shown in Fig. 2. Similarly, the other slider 53 is pivotally connected to an upwardly-extending arm 56c by a rod 56d as best shown in Figs. 1 and 4, the arm 56c being secured to the transverse rod 54a. The arm 56c corresponds to the arm 55a of the bell crank member 55 and the rod 56d corresponds to the rod 56b. Thus, by rotating the bell crank member 55 to rotate the transverse rod 54a, the arms 55a and 56c act through the pivoted rods 56b and 56d to move the sliders 53, and consequently the cross bar 52, toward or away from the grinding wheel 34. The cross bar 52 may be locked in any desired position by means of the wing nuts 55c.

A more accurate adjustment of the position of the cross bar 52 relative to the grinding wheel 34 may be obtained by cam means 57 mounted on each slider 53. As best shown in Fig. 2, each cam means 57 consists of a cylindrical cam member 57a which is pivoted at a point eccentric to its center on a shaft 57c carried by a slider 53. The cam 57a is free to turn in a cylindrical cavity in a connecting rod attachment member or bearing 57b. One end of the connecting rod 56b is connected to the bearing or attachment member. A handle 58 is rigidly connected to each shaft 57c so that rotation of the handles rotates the eccentrics 57a to adjust the position of the cross bar relative to the grinding wheel 34.

A skilled operator can very quickly and securely position the lawn mower for grinding the revolving blades, as shown in Fig. 9, or for grinding the stationary blade, as shown in Fig. 10. The lawn mower or the stationary blade is held on clamps 60 which slide on the square cross bar and which may be secured in any position thereon by set-bolts turned by handwheels 61. The lawn mower itself may be positioned as shown in Fig. 9, or the stationary blade may be positioned as shown in Fig. 10 between conical centers 62 carried on the clamps 60. The centers 62 engage holes in the frame of the lawn mower 63, and it is so held that the revolving knives 64 of the lawn mower may be sharpened by the grinding wheel 34. The revolving knives are mounted in what is termed a "reel," and, like a screw thread, they may form either a right-hand or a left-hand helix. Either right-hand or left-hand blades can be sharpened in my machine.

The stationary blade 70 is carried on the cutter bar of the lawn mower, this cutter bar and the blade 70 being removed from the mower and mounted between the centers 62 for sharpening, as shown in Fig. 10. To hold the stationary blade 70 in proper position for grinding, I provide an arm 71 pivoted on a stud 72 on one of the clamps 60, in the free end of which arm 71 an adjusting screw 73 is threaded. When sharpening the revolving blades 64, the arm 71 is not needed and is turned out of the way, as shown in Fig. 9, but when the stationary blade 70 is sharpened, the arm 71 is thrown into operating position, and the screw 73 is turned to hold the blade 70 in its proper position for grinding.

I claim as my invention:

1. In a machine for sharpening lawn mower blades, the combination of: a supporting structure carrying guide bars which extend across the structure; a carriage movable longitudinally of said bars on said bars; a grinding wheel supported on said carriage; a cross bar extending across the structure; means carried on said cross bar for supporting the blade to be sharpened; two sliders resting on said structure at either side thereof and guided for sliding movement on said structure independently of each other in a direction at right angles to the axes of said guide bars and toward and from said guide bars, one of said sliders supporting one end of said cross bar and the other of said sliders supporting the other end of said cross bar; a handle arm pivoted on said structure; and mechanism connecting said handle arm and each of said sliders by which an angular movement of said handle arm in one direction moves each of said sliders through an equal distance away from said guide bars and an angular movement of said handle bar in the opposite direction moves each of said sliders through an equal distance toward said guide bars, said mechanism being adjustable to move one of said sliders independently of the other.

2. In a machine for sharpening lawn mower blades, the combination of: a supporting structure carrying guide bars which extend across the structure; a carriage movable longitudinally of said bars on said bars; a grinding wheel supported on said carriage; a cross bar extending across the structure; means carried on said cross bar for supporting the blade to be sharpened;

two sliders resting on said structure at either side thereof and capable of moving on said structure in a direction at right angles to the axes of said guide bars, one of said sliders supporting one end of said cross bar and the other of said sliders supporting the other end of said cross bar; a handle arm rigidly secured at one end to a transverse, rotatable rod which extends across the structure substantially parallel to said guide bars; two crank levers of equal length rigidly secured on opposite ends of said transverse rod and turning with said rod as it is turned by said handle arm; and two rods at either side of said structure, one rod being pivoted at one end on the free end of one of said crank levers, and the other being pivoted at one end on the free end of the other of said crank levers, each of said rods being pivoted at its other end on one of said sliders.

3. In a machine for sharpening lawn mower blades, the combination of: a supporting structure carrying guide bars which extend across the structure; a carriage movable longitudinally of said bars on said bars; a grinding wheel supported on said carriage; a cross bar extending across the structure; means carried on said cross bar for supporting the blade to be sharpened; two sliders resting on said structure at either side thereof and capable of moving on said structure in a direction at right angles to the axes of said guide bars, one of said sliders supporting one end of said cross bar and the other of said sliders supporting the other end of said cross bar; a cylindrical cam means mounted on each end of said cross bar and adapted to rotate about a center thereon, the cross bar passing eccentrically through said cam means on a line parallel to but not coincident with said center; a handle attached to each cam means and so placed as to turn the cam means in said slider; a handle arm pivoted on said structure; and mechanism connecting said handle arm and said sliders by which an angular movement of said handle arm in one direction moves each of said sliders through an equal distance away from said guide bars and an angular movement of said handle bar in the opposite direction moves each of said sliders through an equal distance toward said guide bars.

4. In a machine for sharpening lawn mower blades, the combination of: a supporting structure including two, mutually parallel, end members, one on one end and the other at the other end of said structure; two, mutually parallel, guide bars, each secured to said end members and extending at right angles to said end members between said members; a carriage supported and guided by said guide bars and movable longitudinally in a direction parallel to said guide bars; a grinding wheel supported by said carriage with its cutting surface approximately parallel to said direction of motion; two sliders, each being supported on and guided by one of said end members and movable on said end members in a direction at right angles to the line of motion of said carriage; a cross bar parallel to the line of motion of said carriage, attached at one end to one of said sliders and attached at the other end to the other of said sliders; two clamps carried by said cross bar and movable longitudinally thereon; means for clamping said clamps to said cross bar at any desired position thereon; centers carried by said clamps and so formed as to engage the parts to be sharpened; a transverse lever shaft extending parallel to the line of motion of said carriage and journaled in said structure; two levers, one rigidly attached to one end of said transverse lever shaft and the other rigidly attached to the other end of said shaft, the free ends of said levers moving through an arc centering on the axis of said transverse lever shaft; and two connecting rods, one pivoted at one end on the free end of one of said levers and pivoted on the other end on one of said sliders, the other connecting rod being pivoted at one end on the free end of the other of said levers and at its other end to the other of said sliders.

5. In a machine for sharpening lawn mower blades, the combination of: a supporting structure including two mutually parallel, end members, one on one end and the other at the other end of said structure; two, mutually parallel, guide bars, each secured to said end members and extending at right angles to said end members between said members; a carriage supported and guided by said guide bars and movable longitudinally in a direction parallel to said guide bars; a grinding wheel supported by said carriage with its cutting surface approximately parallel to said direction of motion; two sliders, each being supported on and guided by one of said end members and movable on said end members in a direction at right angles to the line of motion of said carriage; a cross bar parallel to the line of motion of said carriage, attached at one end to one of said sliders and attached at the other end to the other of said sliders; two clamps carried by said cross bar and movable longitudinally thereon; means for clamping said clamps to said cross bar at any desired position thereon; centers carried by said clamps and so formed as to engage the parts to be sharpened; a transverse lever shaft extending parallel to the line of motion of said carriage and journaled in said structure; two levers, one rigidly attached to one end of said transverse lever shaft and the other rigidly attached to the other end of said shaft, the free ends of said levers moving through an arc centering on the axis of said transverse lever shaft; two connecting rod bearings; two connecting rods, each having one end pivoted on the free end of one of said levers, the other end of each of said connecting rods being connected to one of said connecting rod bearings; and two adjustment means, one connecting one of said bearings with one slider and the other connecting the other bearing to the other slider for adjustment of said bearings relative to said sliders.

6. In a machine for sharpening lawn mower blades, the combination of: a supporting structure including two, mutually parallel, end members, one on one end and the other at the other end of said structure; two, mutually parallel, guide bars, each secured to said end members and extending at right angles to said end members between said members; a carriage supported and guided by said guide bars and movable longitudinally in a direction parallel to said guide bars; a grinding wheel supported by said carriage with its cutting surface approximately parallel to said direction of motion; two sliders, each being supported on and guided by one of said end members and movable on said end members in a direction at right angles to the line of motion of said carriage; a cross bar parallel to the line of motion of said carriage, attached at one end to one of said sliders and attached at the other end to the other of said sliders; two clamps carried by said cross bar and movable longitudinally thereon; means for clamping said clamps to said cross bar at any desired position thereon; centers carried by said clamps and so formed as to engage the parts to be sharpened; a transverse lever shaft extending parallel to the line of motion of said carriage and journaled in said structure; two levers, one rigidly attached to one end of said transverse lever shaft and the other rigidly attached to the other end of said shaft, the free ends of said levers moving through an arc centering on the axis of said transverse lever shaft; two connecting rod bearings; two connecting rods, each having one end pivoted on the free end of one of said levers, the other end of each of said connecting rods being connected to one of said connecting rod bearings; two cylindrical cams each pivoted eccentrically on one of said sliders, and each turning independently of the other in a cylindrical cavity in one of said bearings, thus linking the connecting rods connected to said bearings to said sliders; and two handles adapted to rotate said cams, one rigidly attached to one of said cams and the other rigidly attached to the other of said cams.

7. In a machine for sharpening lawn mower blades, the combination of: a supporting structure including two, mutually parallel, end members, one on one end and the other at the other end of said structure; two, mutually parallel, guide bars, each secured to said end members and extending at right angles to said end members between said members; a carriage supported and guided by said guide bars and movable longitudinally in a direction parallel to said guide bars; a grinding wheel supported by said carriage with its cutting surface approximately parallel to said direction of motion; two sliders, each being supported on and guided by one of said end members and movable on said end members in a direction at right angles to the line of motion of said carriage; a cross bar parallel to the line of motion of said carriage, attached at one end to one of said sliders and attached at the other end to the other of said sliders; two clamps carried by said cross bar and movable longitudinally thereon; means for clamping said clamps to said cross bar at any desired position thereon; centers carried by said clamps and so formed as to engage the parts to be sharpened; a transverse lever shaft extending parallel to the line of motion of said carriage and journaled in said structure; two levers, one rigidly attached to one end of said transverse lever shaft, and the other rigidly attached to the other end of said shaft, the free ends of said levers moving through an arc centering on the axis of said transverse lever shaft; two connecting rods, one pivoted at one end of the free end of one of said levers and pivoted on the other end on one of said sliders, the other connecting rod being pivoted at one end on the free end of the other of said levers and at its other end to the other of said sliders; a brace having one end adjacent one of said sliders and its other end adjacent said supporting structure, one of said ends being pivoted to the said adjacent means and the other end being guided for sliding movement relative to the said means adjacent thereto; and releasable locking means to lock said other end against movement relative to the said means adjacent thereto whereby to lock said sliders against movement on said end members.

FRED J. MACHOVEC.

REFERENCES CITED

The following references are of record in the file of this patent:

UNITED STATES PATENTS

| Number | Name | Date |
| --- | --- | --- |
| 595,125 | Kirsten | Dec. 7, 1897 |
| 805,127 | Fetters | Nov. 21, 1905 |
| 956,237 | Warner | Apr. 26, 1910 |
| 1,605,890 | Brown | Nov. 2, 1926 |
| 2,088,402 | Borck | July 27, 1937 |
| 2,142,669 | Carpenter | Jan. 3, 1939 |
| 2,180,911 | Rogers | Nov. 21, 1939 |
| 2,281,055 | Smith | Apr. 28, 1942 |
| 2,286,970 | Maynard | June 16, 1942 |
| 2,315,794 | Johnson | Apr. 6, 1943 |
| 2,377,126 | Brown | May 29, 1945 |
| 2,405,468 | Talboys | Aug. 6, 1946 |

Certificate of Correction

Patent No. 2,466,905. April 12, 1949.

FRED J. MACHOVEC

It is hereby certified that errors appear in the printed specification of the above numbered patent requiring correction as follows:

Column 1, lines 44 and 45, strike out the words "or end member" and insert the same in line 45, after "cross-member";

and that the said Letters Patent should be read with these corrections therein that the same may conform to the record of the case in the Patent Office.

Signed and sealed this 9th day of August, A. D. 1949.

[SEAL]

THOMAS F. MURPHY,
*Assistant Commissioner of Patents.*